(12) United States Patent
Schweickhardt et al.

(10) Patent No.: US 12,233,790 B2
(45) Date of Patent: Feb. 25, 2025

(54) METHOD FOR CHECKING AT LEAST ONE VEHICLE, AND ELECTRONIC COMPUTING DEVICE

(71) Applicant: Mercedes-Benz Group AG, Stuttgart (DE)

(72) Inventors: Frank Schweickhardt, Stuttgart (DE); Jessica Gasper, Herrenberg (DE); Johannes Weiss, Sindelfingen (DE)

(73) Assignee: Mercedes-Benz Group AG, Stuttgart (DE)

( * ) Notice: Subject to any disclaimer, the term of this patent is extended or adjusted under 35 U.S.C. 154(b) by 604 days.

(21) Appl. No.: 17/299,418

(22) PCT Filed: Nov. 11, 2019

(86) PCT No.: PCT/EP2019/080865
§ 371 (c)(1),
(2) Date: Jun. 3, 2021

(87) PCT Pub. No.: WO2020/114724
PCT Pub. Date: Jun. 11, 2020

(65) Prior Publication Data
US 2022/0055557 A1 Feb. 24, 2022

(30) Foreign Application Priority Data
Dec. 4, 2018 (DE) ............. 10 2018 009 451.1

(51) Int. Cl.
*B60R 16/023* (2006.01)
*G07C 5/00* (2006.01)
*G07C 5/08* (2006.01)

(52) U.S. Cl.
CPC .......... *B60R 16/0234* (2013.01); *G07C 5/008* (2013.01); *G07C 5/0808* (2013.01)

(58) Field of Classification Search
CPC .... G07C 5/0808; G07C 5/008; G07C 5/0825; B60R 16/0234; H04W 4/40; H04W 4/38; G01M 17/00
See application file for complete search history.

(56) References Cited

U.S. PATENT DOCUMENTS 9,520,006 B1 * 12/2016 Sankovsky ............. G07C 5/02
9,824,453 B1 * 11/2017 Collins .................. G06V 20/20
(Continued)

FOREIGN PATENT DOCUMENTS

AU  2014312218 A1 *  2/2016  ............ G06Q 10/20
CN  105610850 A      5/2016
(Continued)

OTHER PUBLICATIONS

Chinese Office Action issued in Chinese application No. 201980079417.2 dated Mar. 31, 2023, with partial English translation (Ten (10) pages).
(Continued)

*Primary Examiner* — Angelina M Shudy
*Assistant Examiner* — Mark Robert Heim
(74) *Attorney, Agent, or Firm* — Crowell & Moring LLP

(57) ABSTRACT

A method for checking a vehicle includes receiving measured data by an electronic computing device which is external to the vehicle and which is different from the vehicle. The measured data are received from a measurement device which is different from the vehicle and different from the electronic computing device and the measured data characterize an acceleration of the vehicle recorded by the measurement device and/or a noise of the vehicle recorded by the measurement device and/or an image of a subregion of the vehicle recorded by the measurement device. The received measured data are evaluated by the electronic computing device and the vehicle is checked for a malfunc-
(Continued)

tion based on the evaluating of the received measured data by the electronic computing device.

6 Claims, 3 Drawing Sheets

(56) References Cited

U.S. PATENT DOCUMENTS

| | | | |
|---|---|---|---|
| 9,824,508 B2* | 11/2017 | Busch-Sorensen | G06Q 50/40 |
| 9,886,771 B1* | 2/2018 | Chen | G06F 3/04845 |
| 10,095,799 B2* | 10/2018 | Corriere | G07C 5/008 |
| 11,922,618 B2* | 3/2024 | Nussbaum | G06T 7/50 |
| 2008/0161989 A1* | 7/2008 | Breed | B60N 2/0244 |
| | | | 701/31.4 |
| 2008/0284575 A1* | 11/2008 | Breed | G07C 5/008 |
| | | | 701/31.4 |
| 2012/0277949 A1* | 11/2012 | Ghimire | G07C 5/008 |
| | | | 701/31.7 |
| 2013/0201354 A1* | 8/2013 | LaScolea | G11B 27/031 |
| | | | 348/207.1 |
| 2013/0290036 A1* | 10/2013 | Strange | G06Q 40/08 |
| | | | 705/4 |
| 2014/0277902 A1* | 9/2014 | Koch | G07C 5/008 |
| | | | 701/29.1 |
| 2015/0287130 A1* | 10/2015 | Vercollone | G06V 10/235 |
| | | | 705/34 |
| 2016/0035150 A1* | 2/2016 | Barfield, Jr. | G05B 23/0254 |
| | | | 701/29.3 |
| 2016/0049017 A1* | 2/2016 | Busse | G07C 5/008 |
| | | | 701/33.3 |
| 2016/0148446 A1* | 5/2016 | Corriere | G07C 5/0816 |
| | | | 701/29.1 |
| 2016/0189440 A1* | 6/2016 | Cattone | G06Q 30/06 |
| | | | 701/31.5 |
| 2016/0325680 A1* | 11/2016 | Curtis | H04W 4/024 |
| 2016/0349330 A1* | 12/2016 | Barfield, Jr. | G01R 31/389 |
| 2017/0011561 A1* | 1/2017 | Makke | B60T 17/221 |
| 2017/0076511 A1* | 3/2017 | Busch-Sorensen | G07C 5/008 |
| 2017/0206718 A1* | 7/2017 | Kapoor | G07C 5/0808 |
| 2018/0272966 A1* | 9/2018 | Bruns | B60R 16/0234 |
| 2018/0315260 A1* | 11/2018 | Anthony | G06N 5/022 |
| 2018/0322714 A1* | 11/2018 | Gennotte | G07C 5/0808 |
| 2019/0025813 A1* | 1/2019 | Cella | G06F 18/2178 |
| 2019/0050458 A1* | 2/2019 | Merg | G06F 16/2471 |
| 2019/0121353 A1* | 4/2019 | Datema | B28C 7/022 |
| 2019/0196680 A1* | 6/2019 | Park | G06V 10/255 |
| 2019/0279447 A1* | 9/2019 | Ricci | G06F 16/951 |
| 2019/0287080 A1* | 9/2019 | Penilla | G06F 9/00 |
| 2020/0143593 A1* | 5/2020 | Rudman | G06T 19/006 |
| 2020/0234515 A1* | 7/2020 | Gronsbell | H04Q 9/00 |
| 2023/0230166 A1* | 7/2023 | Tomlinson | G06N 3/0464 |
| | | | 705/4 |

FOREIGN PATENT DOCUMENTS

| | | |
|---|---|---|
| CN | 105719359 A | 6/2016 |
| CN | 108290537 A | 7/2018 |
| DE | 10 2017 204 941 A1 | 9/2018 |
| KR | 10-1513084 B1 | 4/2015 |
| WO | WO 2017/048892 A1 | 3/2017 |

OTHER PUBLICATIONS

PCT/EP2019/080865, International Search Report (PCT/ISA/220 and PCT/ISA/210) dated Jan. 24, 2020, with partial English translation, enclosing Written Opinion of the International Searching Authority (PCT/ISA/237) (Fifteen (15) pages).
German-language German Office Action issued in German application No. 10 2018 009 451.1 dated Jan. 28, 2021 (Six (6) pages).
Chinese Office Action issued in Chinese application No. 201980079417.2 dated Jul. 5, 2022, with partial English translation (Thirteen (13) pages).
Guyun, "A Classic Book on Auto Repair", www.sohu.com/251823683_602722, dated Sep. 4, 2018, (Twelve (12) pages), Chinese-language.
Chinese Office Action issued in Chinese application No. 201980079417.2 dated Jan. 13, 2023 (Nine (9) pages).

* cited by examiner

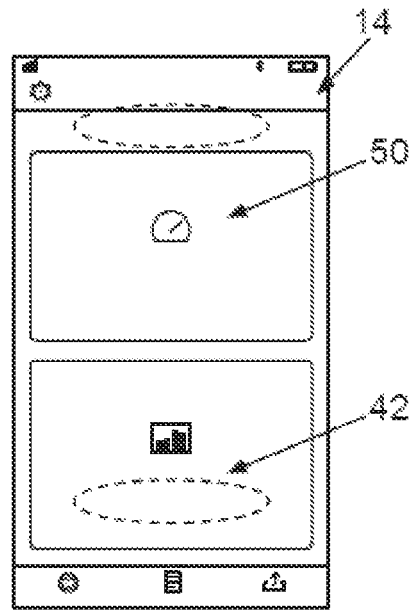
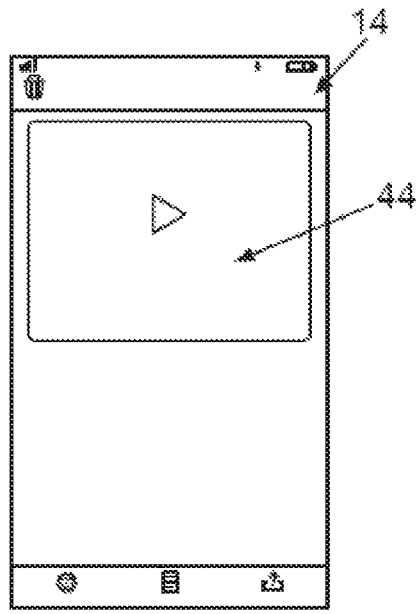
Fig.4       Fig.5
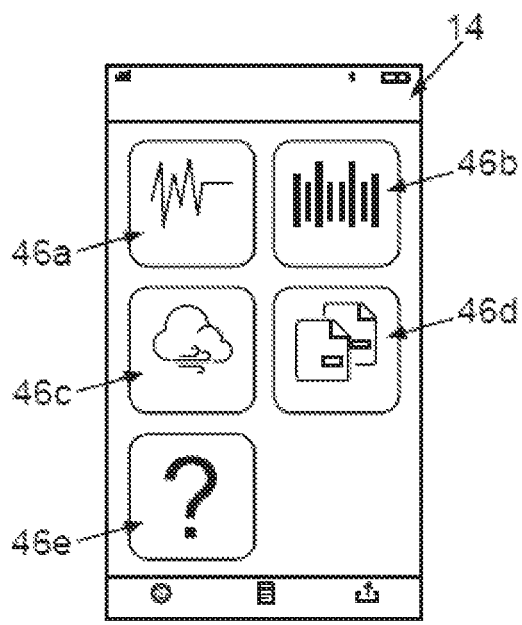
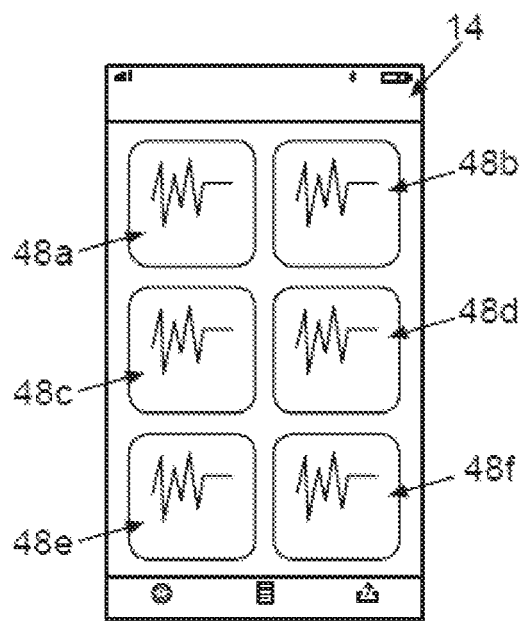
Fig.6       Fig.7

METHOD FOR CHECKING AT LEAST ONE VEHICLE, AND ELECTRONIC COMPUTING DEVICE

BACKGROUND AND SUMMARY OF THE INVENTION

The invention relates to a method for checking at least one vehicle and to an electronic computing device. WO 2017/048892 A1 discloses a method of data collection from sensors of a vehicle. Furthermore, a vehicle network management system is known from CN 105610850 A.

Furthermore, KR 101513084 B1 discloses a vehicle information system.

The object of the present invention is to provide a method and an electronic computing device in order for at least one vehicle to be able to be checked in a particularly advantageous way.

A first aspect of the invention relates to a method for checking at least one vehicle, for example in the form of a motor vehicle, in particular a car, wherein the above and following statements regarding the vehicle can also be transferred to other apparatus, for example mechanical and/or electrical machines or apparatus and/or corresponding complex systems, and vice-versa. The other apparatus may be, for example, simple technical apparatus, especially simple ones. In particular, the other apparatus may be drive systems, individual motors, electric motors and/or household appliances, for example washing machines, hair dryers, toothbrushes, etc. The apparatus may further be tools, such as drills, saws, etc.

In the method, measured data are received by means of an electronic computing device, which is for example a central electronic computing unit and/or is referred to as server, back-end or back-end server, and provides or forms for example a data cloud, also referred to as cloud, which electronic computing device is external to the at least one vehicle and different from the at least one vehicle, and which measured data are provided by at least one measurement device different from the at least one vehicle and from the electronic computing device.

The feature whereby the electronic computing device, also simply referred to as computing device, is external to the at least one vehicle and different from the at least one vehicle should be understood to mean that the electronic computing device is not a component or constituent of the vehicle, but rather is provided in addition to the vehicle and is therefore different from the vehicle, and therefore the electronic computing device and the vehicle, for example in the form of a motor vehicle, in particular of a car and preferably of a passenger car, are each individual and separate apparatus or units. The feature whereby the, preferably mobile, measurement device is a measurement device different from the at least one vehicle and from the electronic computing device should be understood to mean that the measurement device is neither a constituent of the vehicle or a constituent of the computing device, and therefore the measurement device is provided in addition to the vehicle and in addition to the electronic computing device.

The electronic computing device, the vehicle and the, preferably mobile, measurement device, which can for example be in the form of a mobile terminal, are therefore separate and individual units or apparatus. The measurement device is preferably a mobile transmitter, in particular a mobile telecommunications terminal, which for example can receive and/or send or provide data in a wireless or cable-free manner and therefore for example by radio. The, preferably mobile, measurement device is for example a mobile terminal, for example a mobile telephone, also referred to as smartphone.

The measured data characterize at least one acceleration recorded by means of the measurement device and/or at least one noise recorded by means of the measurement device and/or at least one image recorded by means of the measurement device, of at least one subregion of the at least one vehicle. In other words, the measured data characterize at least one measured variable which is recorded, or was recorded, by means of the measurement device. The measurement device provides the measured data, in particular wirelessly, and therefore for example the measured data are transmitted, in particular wirelessly, from the measurement device to the electronic computing device. The abovementioned measured variable comprises the at least one acceleration recorded by means of the measurement device and/or the at least one noise recorded by means of the measurement device and/or the image recorded by means of the measurement device. The acceleration is an acceleration of the vehicle, and the noise is a noise of the vehicle, i.e., a noise emitted by the vehicle, and the image is an image of at least one subregion of the vehicle. The acceleration was or is recorded for example by means of at least one acceleration sensor of the measurement device. Alternatively or additionally, the noise is or was recorded for example by means of at least one microphone of the measurement device. Alternatively or additionally, the image of the subregion of the vehicle is or was recorded by means of at least one camera of the measurement device.

Furthermore, the method provides for the received measured data to be evaluated by means of the electronic computing device. In other words, the electronic computing device receives the measured data, and the electronic computing device evaluates the measured data. Furthermore, the method provides for the at least one vehicle to be checked, in particular for at least one malfunction, based on the evaluation of the measured data by means of the electronic computing device. In other words, the measured data, and therefore the measured variable, are analysed and compared for example with target data or target values. If for example the measured data, which are in particular used as actual data, deviate from the target data or if a deviation of the measured data from the target data exceeds an in particular predefined or predefinable threshold, then it is concluded for example by means of the electronic computing device that the at least one vehicle has a fault or a malfunction. However, if the measured data correspond to the target data, or if a potential deviation does not exceed the threshold, then it is concluded by means of the electronic computing device that there is no fault or malfunction of the at least one vehicle.

The method according to the invention is therefore a method for analysis, in particular for fault analysis, of the vehicle, and therefore the method makes it possible to detect potential malfunctions of the at least one vehicle in a particularly simple and precise way and at a particularly early stage. For this, the vehicle does not have to be brought to a garage or similar facility, but rather, in the context of the method, it is possible to use objects that are already present in everyday life, for example the measurement device designed as a person's mobile terminal, in order to check or analyse the vehicle. The method according to the invention is therefore a platform, or enables the creation of a platform, for the, in particular mobile, analysis of for example acoustic and/or vibrational phenomena which may be generated or produced by the vehicle and which may be recorded by means of the measurement device. This means that the above-described measured variable may be or may characterize for example an acoustic and/or mechanical phenomenon. By recording the measured variable, the phenomenon is recorded and characterized by the measured data, and therefore the phenomenon can be analysed by means of the electronic computing device. It is consequently possible to determine whether or not the phenomenon is a malfunction. In particular, it is possible to determine whether the acceleration or the noise or at least one feature contained in the image results from a fault or a malfunction of the at least one vehicle, or for example belongs to a fault-free function of the at least one vehicle.

In principle, it is conceivable that the measured variable or the measured data is already processed or worked on by the measurement device itself, such that, for example, the measured data are subjected to a mathematical transformation by the measurement device, in particular before they are received by the electronic computing device. In the context of this mathematical transformation, the measured data are for example processed such that a time or a time base is converted into at least one or more frequencies or frequency ranges.

The electronic computing device makes it possible to produce an in particular central data cloud in which the measured data which characterize the at least one vehicle can be collected and in particular stored. Furthermore, for example, further measured data which characterize several further vehicles can be collected and stored. The central data cloud also enables a connection of measured data which were or are generated by complex measuring systems and/or result from at least one or more simulations. The central data cloud further enables a connection of data from production and/or field and/or service diagnostics and alternatively or additionally from customer operation. This data forms for example a data pool and can be analysed or evaluated as described above, in order for example to check the at least one vehicle.

It is possible by means of the invention to check the at least one vehicle during its complete product life cycle, i.e., from the beginning to the end of the service life of the vehicle, and to create a product-accompanying platform that can be used in this respect and thereby ensure and continuously optimise desired vehicle properties. The platform offers a central and continuous applicability of digital methods over the entire product life cycle, and generates a high potential for increasing efficiency, process quality and product quality by advantageously utilising hardware and capacity resources. The invention further enables a potential shortening of development times and an understanding of complex correlations in order to improve product design and decision-making processes. Moreover, the use of the platform is possible in a customer environment, in the context of which for example people can interact or communicate with the platform via a software application, also referred to as app or software app, which is executed on the measurement device.

The invention is based in particular on the following knowledge: functional data, which for example characterize acoustic and/or vibrational phenomena of a vehicle, are usually only recorded and analysed by means of expensive measuring instrumentation. This only enables use by a limited group of users and vehicles, in particular in the context of a development process. Only experts are used, and analysis of such phenomena in areas outside of development is hardly possible, or not at all. Therefore, vehicle resources are not efficiently and comprehensively utilised in a development phase, and this also applies to production and service, i.e., maintenance. To date, statistical measured data of for example acoustic and/or vibrational phenomena of a vehicle have not been widely available, in particular during a product development process. This also applies to the scope of production and service, also with regard to customer data from the field. The corresponding measured data has to date not been suitable for machine-based evaluation. Logical evaluation has therefore also not been possible.

The invention now makes it possible to overcome the abovementioned disadvantages or problems. To this end, the invention makes it possible to produce a central data store for storing and evaluating all possible data sources from testing, simulation, production and customer operation. In other words, it is possible to receive and evaluate the measured data provided by the measurement device already during a product development process and thus to analyse it and incorporate it into a product development process in order to be able to ensure or improve desired properties. To this end, the invention does not, or does not only, use expensive measuring technology which is only present in garages or development sites, but rather the invention uses simple measurement devices, for example in the form of mobile terminals, which may be designed as mobile phones, smartphones or the like. The measurement device provides the measured data in particular wirelessly, and therefore the measured data, in particular from several measurement devices, can be received and in particular stored centrally by means of the electronic computing device.

Aside from the applicability of the platform or of the method according to the invention to acoustic and vibrational phenomena, there is also the possibility of applying it to all further phenomena which can be recorded in particular by means of an available sensor system, for example by means of a microphone and/or by means of an acceleration sensor and/or by means of an optical camera.

The measurement device preferably has an apparatus by means of which the noise and/or the image and/or the acceleration can be recorded. Alternatively or additionally, the measurement device has an, in particular graphic, operating interface, also referred to as user interface or interface, which is for example an integrated operating interface. A person, i.e., a user of the measurement device, can make inputs into the measurement device via the operating interface, and thus interact with the measurement device. The abovementioned phenomena which can be recorded by means of the measurement device, are usually dependent on static and/or statistical occurrences and/or complex correlations, with these phenomena being able to be analysed by the electronic computing device by the electronic computing device collecting the measured data. The phenomena are for example phenomena for analysing the driving and suspension comfort and driving dynamics, phenomena for analysing component and surface tolerances, phenomena for analysing clearances on assemblies, phenomena for analysing position and positional properties, in particular of components in assemblies, and/or phenomena for analysing changes and wear properties during operation, and/or other phenomena. The concept underlying the invention is the use of many available vehicles or each available vehicle, in particular each test vehicle, in particular as an extension of each production and customer vehicle in the area, in order to generate data and analyse phenomena. To this end, respective phenomena of the available vehicles are recorded by means of respective, in particular mobile, measurement devices and measured data characterizing the recorded phenomena are provided, which are received and evaluated by the electronic computing device. The received measured data can be used to monitor the at least one vehicle or the vehicles particularly precisely and continuously, in order to be able to incorporate knowledge from the evaluation of the measured data into a development process and/or into an improvement of the respective vehicle.

The measurement device is preferably an everyday means of measurement, for example a smartphone, by means of which the measured data are recorded or captured, with the measurement device preferably having the integrated user interface. The user interface is also referred to as interface. The measurement device preferably has an, in particular mobile, connection to the vehicle or the measured object and/or to an object database and/or to general object state data and/or to surroundings data.

In an advantageous configuration of the invention, the measured data characterize a state of the at least one vehicle and/or a position of the at least one vehicle on earth. As a result, the state or the position is assigned to the measured data or the measured variable recorded by the measurement device, and therefore the conditions under which the measured data or the measured variable were recorded can be taken into account. The state is for example an, in particular current, driving state, wherein the vehicle has or had the state when the measured variable was recorded by means of the measurement device. Alternatively or additionally, the position is determined for example by means of a navigation device of the measurement device, in particular satellite navigation. It is in particular conceivable that the measurement device is connected to the vehicle via at least one data link and/or wirelessly, and therefore for example the measurement device receives state data which are provided by the vehicle and characterize for example the state of the vehicle. The state of the vehicle includes for example a speed and/or a temperature of the vehicle and/or a temperature prevailing in surroundings of the vehicle. In particular, it is provided that the measurement device assigns the state or the position to the measured data, as a result of which the at least one vehicle can be checked particularly precisely. It is further conceivable that the measurement device receives, in particular wirelessly, positional data which are provided by the vehicle and characterize for example the position of the vehicle. The position is or was recorded for example by means of the vehicle, in particular using satellites.

A further embodiment is characterized in that an artificial intelligence is trained, in particular regarding determining the at least one malfunction, based on the measured data by means of the electronic computing device. The training of the electronic computing device is for example carried out such that the measured data as training data characterize a malfunction of the vehicle, in particular one which is actually present, or that the measured data actually do not characterize a malfunction of the vehicle. Moreover, the electronic computing device is informed that the training data characterize or do not characterize the malfunction. As a result, the electronic computing device is trained such that the electronic computing device can distinguish between measured data which characterize a malfunction and measured data which do not characterize a malfunction. This means that the electronic computing device can be used to determine with a very high degree of probability whether or not the at least one vehicle has a malfunction. The at least one vehicle can thus be checked particularly precisely. The artificial intelligence makes it possible to carry out, for example, an analytical analysis. Alternatively or additionally, machine learning, artificial intelligence and also big data methods can be used for the analysis.

In order to be able to check the at least one vehicle particularly precisely, a further configuration of the invention provides for further measured data to be received by means of the electronic computing device external to a further vehicle provided in addition to the vehicle and different from the further vehicle, which measured data are provided by at least one further measurement device different from the further vehicle and from the electronic computing device and characterize at least one further measured variable recorded by means of the further measurement device, for example an acceleration and/or a noise and/or an image of at least one further subregion of the further vehicle. The received further measured data are received and evaluated by means of the electronic computing device, with the at least one vehicle and also preferably the further vehicle being checked for the at least one malfunction or a malfunction by means of the electronic computing device based on the evaluation of the further measured data and based on the evaluation of the first measured data. The background to this embodiment is that of producing a data agglomeration and, to this end, receiving and storing the measured data from a large number of separate measurement devices, with the respective measured data characterizing respective separate vehicles. Consequently, the electronic computing device makes it possible to particularly precisely determine whether the measured variable characterizes a malfunction or a normal state of the vehicle.

It has proven particularly advantageous if the first measured data are assigned to a first component of the at least one vehicle and the further measured data are assigned to a second component of the further vehicle, which second component is structurally identical to the first component, wherein at least the first component is checked for the at least one malfunction. This makes it possible to be able to compare structurally identical components of the respective vehicles with one another. As a result, it is possible to determine with a very high degree of probability whether the respective component is functional or has a malfunction.

In a particularly advantageous embodiment of the invention, the measurement device is provided with result data resulting from the evaluation by means of the electronic computing device. In other words, the electronic computing device provides the result data resulting from the evaluation of the measured data. The result data are for example transmitted from the electronic computing device to the measurement device and received by the measurement device. At least one item of information characterizing the result data is displayed, for example, in particular optically, based on the result data, on an electronic display of the measurement device, also referred to as an electronic screen, on the display of which, for example, the user interface can be or is displayed. As a result, for example, using the displayed information, the abovementioned user of the measurement device can detect whether the at least one vehicle has a malfunction or else is fault-free. The provision of the result data is therefore a response to the measurement device, and therefore the user of the measurement device can detect, using the response, whether or not the electronic computing device has determined a malfunction of the at least one vehicle.

In order to be able to check the at least one vehicle particularly comprehensively and precisely, a further configuration of the invention provides for simulation data, which characterize a simulation of at least a part of the at least one vehicle, and/or production data, which characterize a production of the at least one vehicle, and/or maintenance data, which characterize a maintenance or service of the at least one vehicle, and/or test stand data, which characterize a test of the at least one vehicle carried out by means of a test stand, to be received by means of the electronic computing device; wherein the at least one vehicle is checked for the at least one malfunction based on the simulation data and/or the production data and/or the maintenance data and/or the test stand data by means of the electronic computing device. The simulation, the test stand and/or an apparatus by means of which for example the maintenance data and/or other data characterizing the at least one vehicle are determined and provided, by means of which the at least one vehicle can be checked, are for example an expert system. In addition to the measurement device and/or the respective expert system, it is possible to have recourse, in particular directly, to vehicle sensor technology present in the at least one vehicle. The vehicle sensor technology comprises at least one vehicle sensor, which can be designed as a microphone, as an acceleration sensor or as an optical recording device, for example a camera. The phenomenon is for example recorded by means of the vehicle sensor, and the vehicle sensor provides vehicle sensor data characterizing the phenomenon, by means of which data the at least one vehicle can be checked. The vehicle sensor data are read out, for example wirelessly and thus via a remote system, from the at least one vehicle or transmitted to the server and/or received by the server, as a result of which a particularly advantageous analysis can be produced.

A second aspect of the invention relates to an electronic computing device which is designed to carry out a method according to the first aspect of the invention. Advantages and advantageous configurations of the first aspect of the invention are to be considered as advantages and advantageous configurations of the second aspect of the invention, and vice-versa.

A third aspect of the invention relates to a method for checking at least one vehicle. In the method according to the third aspect of the invention, at least one acceleration and/or at least one noise and/or at least one image of at least one subregion of the at least one vehicle is recorded by means of a measurement device different from the at least one vehicle and designed for example as a mobile terminal, in particular as a mobile transmitter. Moreover, at least one input effected by a person is received by means of the measurement device. The person is a user of the measurement device, with the person inputting the input into the measurement device for example via the abovementioned user interface. In the method according to the third aspect of the invention, a description of the recorded acceleration and/or of the recorded noise and/or of the recorded image is assigned by means of the measurement device based on the input. The assigning of the description to the measured data is also referred to as labelling of the measured data. The description characterizes for example a type and/or a verbal designation of the measured variable, i.e., the acceleration and/or the noise and/or the image.

In the third aspect of the invention, it is further provided that, in order to check the at least one vehicle by means of the measurement device of an electronic computing device external to the at least one vehicle and to the measurement device and different from the at least one vehicle and from the measurement device, measured data are provided which characterize the recorded measured variable (acceleration and/or noise and/or image), wherein the measured data also characterize the description. Advantages and advantageous configurations of the first aspect and of the second aspect of the invention are to be considered as advantages and advantageous configurations of the third aspect of the invention, and vice-versa.

Thus, while the first aspect of the invention targets the electronic computing device, the third aspect of the invention targets the measurement device, which for example provides the measured data described in relation to the first aspect of the invention. The third aspect of the invention is also based on the concept of using an object that is common in everyday life in the form of the measurement device, for example designed as a mobile phone or smartphone or tablet PC, to record the measured variable and subsequently to provide the measured data, and therefore the at least one vehicle can be comprehensively and durably checked using the measurement data. Durable checking should be understood to mean that the at least one vehicle can be checked at least virtually over the entire service life thereof, in particular at respective time intervals, temporally spaced apart from one another, in order to be able to ensure or even optimise a desired function of the at least one vehicle.

Finally, a fourth aspect of the invention relates to a method for checking at least one vehicle. As explained in more detail hereinafter, the fourth aspect of the invention targets both the electronic computing device and the measurement device and therefore a system which comprises both the measurement device and the electronic computing device. In the fourth aspect of the invention, at least one acceleration and/or at least one noise and/or at least one image of at least one subregion of the at least one vehicle is recorded by means of a measurement device different from the at least one vehicle. Measured data which characterize the recorded acceleration and/or the recorded noise and/or the recorded image are provided by means of the measurement device. Furthermore, in the fourth aspect of the invention, measured data provided by the measurement device are received by means of an electronic computing device external to the at least one vehicle and to the measurement device and different from the at least one vehicle and the measurement device. The received measured data are evaluated by means of the electronic computing device, wherein the at least one vehicle is checked by means of the electronic computing device for at least one malfunction based on the evaluation of the measured data. Advantages and advantageous configurations of the first aspect, of the second aspect and of the third aspect of the invention are to be considered as advantages and advantageous configurations of the fourth aspect of the invention, and vice-versa.

The aspects of the invention can be summarised, for example, as follows: firstly, the measured variable is recorded for example by the for example everyday measurement device, which has the integrated user interface and also, for example, a mobile connection to the at least one vehicle and/or to an object database and/or to general object state data and/or to surroundings data. The measurement device generates the above-described measured data, for example from the recorded measured variable. Furthermore, for example, the above-described labelling of the measured data takes place via the user interface, in particular for the subsequent training of the artificial intelligence. The artificial intelligence is trained for example in the context of a supervised learning. The measured data, in particular provided with the description, are for example transmitted, in particular in a mobile manner, to the electronic computing device, in particular along with an object structure and/or along with state and/or surroundings data, which characterize the state or the position, and therefore the surroundings, of the vehicle. For example, the measured data are transmitted to a data cloud which is formed by the electronic computing device. Alternatively or additionally, the measured data are transmitted, in particular in a mobile manner, to a data cloud for analysis, in particular along with the above-described object structure and/or along with the state and/or surroundings data. Moreover, further processing of the measured data takes place in the, or by the, electronic computing device, in particular for training the artificial intelligence and/or by machine-based analysis using analytical methods and artificial intelligence.

In particular by evaluating the measured data, the measured data and thus the measured variable are assigned to at least one or more phenomena and subsequently to system components of the at least one vehicle causing the phenomenon or phenomena. In other words, for example, at least one component of the at least one vehicle, also referred to as a system component, is determined by the evaluation by means of the electronic computing device, with the component, in particular with a certain degree of probability, effecting or causing or being responsible for the phenomenon or the measured variables and thus the acceleration and/or the noise and/or the image. Preferably, the above-described response as a result of the check, also referred to as analysis, is also sent to the measurement device and in particular to the user interface, preferably in real time. Further, for example, an additional evaluation of the measured data and/or an additional evaluation of already-analysed data also take place, in particular in a pre-processing and post-processing, in particular using a data management tool.

The abovementioned central data cloud also enables the connection of measured data, in particular generated by complex measuring systems and/or from data from simulation, as well as data from production and field and service diagnostics, and optionally from customer operation. A corresponding evaluation of the entire data pool, as described above, is possible. In this respect, a product-accompanying platform that can be used throughout the entire product life cycle from design to the end of service life is available to ensure desired properties and their constant optimisation. The platform offers a central, continuous applicability of digital methods over the entire product life cycle, and generates a high potential for increasing efficiency, process quality and product quality by optimally utilising hardware and capacity resources, shortening development times and understanding complex correlations in order to improve product design and decision-making processes.

Preferably, the measurement device has an apparatus via which the measurement device can be connected to the at least one vehicle, in particular in terms of signalling or via a data link. Alternatively or additionally, the measurement device can be connected via the data link to a sensor system external to the measurement device and/or to the vehicle.

The external sensor system or the at least one vehicle can provide data which characterize for example the at least one vehicle and are received by the measurement device. The data are for example linked to the measured data, and therefore the electronic computing device can check the at least one vehicle using the measured data and using the data linked thereto. The data are for example provided by at least one sensor or by a plurality of sensors of the vehicle.

The measurement device executes for example a software application, also referred to as application or app, which for example is executed by means of a central processing unit of the measurement device. By executing the software application, for example, the in particular graphic user interface is displayed on the electronic display of the measurement device. The software app provides in particular an opportunity for a person to be able to perform at least one input into the measurement device via the graphic user interface. This input makes it possible to assign the abovementioned description to the measured data, and therefore the measured data can be labelled. Subsequently, for example, the labelled measured data are transmitted in a mobile manner to the computing device and thus for example to the data cloud.

The mobile measurement device, for example, is for example interlinked with online state and/or surroundings data as well as with databases with information on the structure of the vehicle, wherein these data are assigned to the measured data, in particular via the application. Furthermore, for example, an artificial intelligence is trained using the transmitted and received measured data along with the labelling, for example in the context of supervised learning. Furthermore, for example, phenomena are detected and standardised by machine-based evaluation of the measured data, in particular in real time on the electronic computing device, in particular using analytical methods and artificial intelligence. Furthermore, for example, an integrated vehicle-specific and phenomenon-specific feature engineering is carried out by means of the electronic computing device, for use in the electronic computing device for optimising the probability of detection by the artificial intelligence. Furthermore, the response of the results of the phenomenon detection from the artificial intelligence is provided, for example, from the electronic computing device to the online measurement device, in particular in real time. Preferably, a data manager is provided on the electronic computing device for the further structured analysis of the measured data before and/or after the analysis by the artificial intelligence.

Alternatively or additionally, expandability of the central data cloud or the central electronic computing device along with the above-described analysis capability can be provided to all measured data sources of the complete product life cycle from design to end of service life and therefore, for example, the at least one vehicle is checked based on vehicle test stand and road measurement data with complex expert measurement systems and/or based on simulations and/or based on production and/or based on diagnostics and service data and/or based on data from customer operation.

Further advantages, features and details of the invention will become apparent from the following description of a preferred exemplary embodiment and also using the drawings. The features and combinations of features mentioned above in the description, and also the following features and combinations of features mentioned in the description of the figures and/or only shown in the figures are not only applicable in the respectively stated combinations but also in other combinations or alone, without departing from the scope of the invention.

BRIEF DESCRIPTION OF THE DRAWINGS

FIG. 4 is a schematic depiction of a graphic user interface which is displayed on an electronic display of a measurement device used in the context of the method;

FIG. 5 is a further schematic depiction of the graphic user interface;

FIG. 6 is a further schematic depiction of the graphic user interface; and

FIG. 7 is a further schematic depiction of the graphic user interface.

DETAILED DESCRIPTION OF THE DRAWINGS

Identical or functionally identical elements are provided with the same reference signs in the figures.

Figure 1:
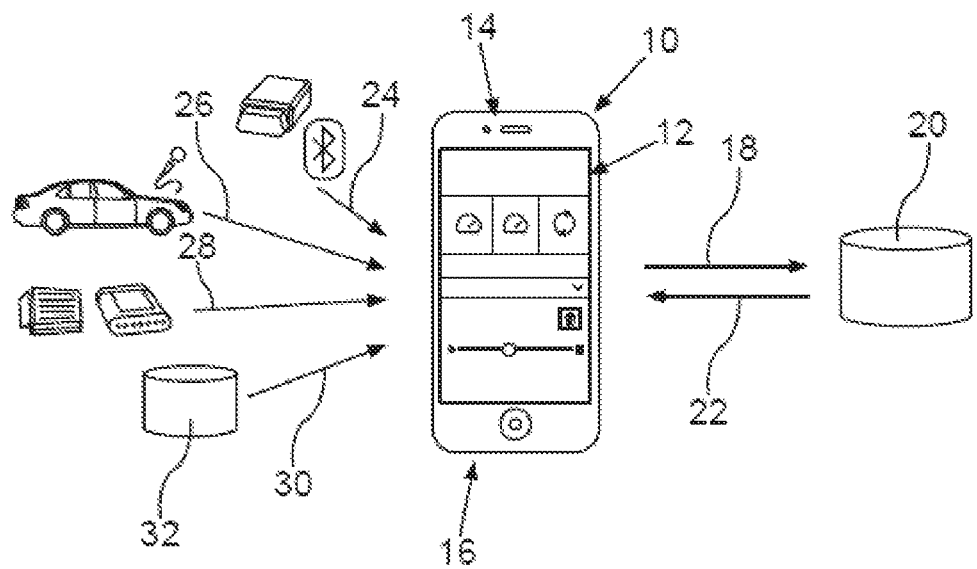
FIG. 1 is a diagram to illustrate a method according to the invention.

FIG. 1 shows a schematic diagram, with a method for checking at least one vehicle being described below using the figure. An electronic measurement device 10 is used in the method, which device, in the exemplary embodiment illustrated in the figure, is designed as a mobile terminal and thus as a mobile transmitter present in the form of a smart phone. The measurement device 10 has a central processing unit which can execute or executes a software application, also referred to as app or application. The measurement device 10 furthermore has an electronic display 12, also referred to as screen or electronic screen, which displays a graphic user interface 14 of the software application. The graphic user interface is also referred to as interface or user interface. The display 12 is designed for example as a touch-sensitive screen, such that a person, i.e., a user, of the measurement device 10 can perform inputs into the measurement device 10 via the user interface 14 and via the touch-sensitive screen.

The measurement device 10 also has a recording device 16, which comprises for example at least one camera and/or at least one microphone and/or at least one acceleration sensor of the measurement device 10. In the context of the method, at least one measured variable is recorded by means of the recording device 16 by means of the at least one measurement device 10 different from the at least one vehicle, wherein the measured variable is at least one acceleration and/or at least one noise of the at least one vehicle. Alternatively or additionally, the measured variable comprises at least one image of at least one subregion of the at least one vehicle. The acceleration of the at least one vehicle is recorded for example by means of the acceleration sensor. Alternatively or additionally, the noise which is emitted by the vehicle is recorded for example by means of the microphone of the measurement device 10. Alternatively or additionally, the image is recorded by means of the camera of the measurement device 10. Moreover, at least one input effected by a person via the user interface 14 is received by means of the measurement device. A description is assigned to the recorded measured variable by means of the measurement device 10, based on the input. This assigning of the description to the measured variable is also referred to as labelling, and therefore the measured variable is labelled. As illustrated by an arrow 18 in FIG. 1, the measurement device provides the measured data, preferably provided with the description, in particular wirelessly. An electronic computing device 20 external to the at least one vehicle and to the measurement device 10 and different from the at least one vehicle and from the measurement device 10, which electronic computing device is also referred to as server or back-end and has for example a database and/or forms a neural network or is a constituent of the neural network, receives the measured data provided by the measurement device 10. The measured data are stored for example in a database. The received measured data are evaluated by means of the electronic computing device 20.

The at least one vehicle is checked, in particular for at least one malfunction, based on the evaluation of the measured data by means of the electronic computing device 20.

As illustrated by an arrow 22 in FIG. 1, the electronic computing device 20 provides for example result data resulting from the evaluation. The result data are transmitted from the computing device 20 to the measurement device 10 and received by the measurement device 10, in particular wirelessly. The transmission of the result data to the measurement device 10 is thus a response, in particular regarding phenomena identified using the evaluation. This means that the evaluation of the measured data makes it possible to determine at least one or more phenomena which are responsible for the measured variable or which cause the measured variable. Further, for example, it is possible to determine whether the phenomenon has been assigned to a malfunction or else to a functional state of the at least one vehicle, and therefore the evaluation of the measured data makes it possible to determine whether the at least one vehicle has a malfunction or else has no malfunctions and is therefore functional.

The measurement device 10 is connected to the at least one vehicle, for example via a wireless data link illustrated by an arrow 24, in particular via Bluetooth and/or radio waves. The measurement device 10 receives for example driving data, provided by the at least one vehicle, via the, in particular wireless, data link. The driving data characterize for example a state, in particular a driving state, of the at least one vehicle, wherein the driving data are assigned to the measured data or are linked to the measured data. As a result, in particular in the context of the measured data, the driving data are also transmitted to the electronic computing device 20, and therefore for example the electronic computing device 20 can check the at least one vehicle also based on the driving data or based on the state of the vehicle.

As further illustrated by an arrow 26, the measurement device 10 can receive sensor data from an external sensor system, in particular via a wireless data link, which sensor system is for example an integrated and/or additional sensor system. The sensor data characterize for example at least one further state of the at least one vehicle. As further illustrated by an arrow 28, the measurement device 10 for example receives, in particular via a wireless data link, measurement instrumentation data, which for example characterize acoustic phenomena or noises, in particular of the at least one vehicle. As further illustrated by an arrow 30, the measurement device 10 receives, for example via a wireless data link, metadata, which characterize a state of construction and/or special accessories and/or other variables of the at least one vehicle, wherein the metadata originate from one or more vehicle databases 32. The sensor data and/or the measurement instrumentation data and/or the metadata are for example linked to the measured data and transmitted from the measurement device 10 to the electronic computing device 20 in the context of the measured data and received by the electronic computing device 20, and therefore the electronic computing device 20 can also check the at least one vehicle based on measurement instrumentation data and/or metadata and/or based on the sensor data. By evaluating the measured data, the driving data and/or the sensor data and/or the measurement instrumentation data and/or the metadata are also evaluated, and, using this, the at least one vehicle is checked.

The measured data which are transmitted from the measurement device 10 to the electronic computing device 20 and received by the electronic computing device 20 are used, for example, in order to populate the database and/or to train an artificial intelligence, for example the neural network, in particular in terms of detecting a malfunction of the at least one vehicle. The artificial intelligence is also denoted AI.

Figure 2:
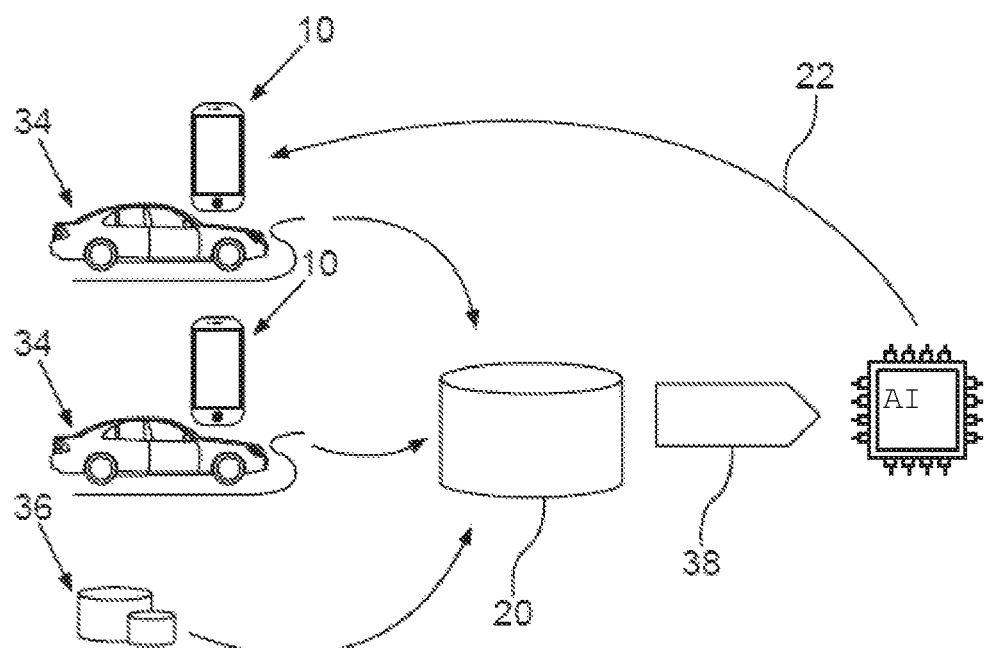
FIG. 2 is a further diagram to illustrate the method.

FIG. 2 shows a diagram for further illustrating the method. The measured data are for example used to carry out feature recognition by means of the artificial intelligence AI. In the context of the feature recognition, at least one phenomenon from which the measured variable results is determined. By determining the phenomenon, it is possible to determine whether the measured variable results from a malfunction or else from a fault-free state of the at least one vehicle. The phenomenon is thus a result of the evaluation of the measured data, wherein the result—as also illustrated in FIG. 2 by the arrow 22—is transmitted back to the measurement device 10.

The measured variable is for example determined by a test driver in the context of a test drive, wherein the measured data are for example noise vibration harshness (NVH) measured data, and therefore characterize at least one noise or noises of the at least one vehicle. In order to record the measured variable in the context of the test drive and subsequently accordingly transmit the measured data to the electronic computing device 20 via the measurement device 10, a test drive mode of the software application is for example set and selected, in particular via the user interface 14.

A noise expert for example carries out a further test of the vehicle designated 34 in FIG. 2, and therefore the measured data are for example NVH training data. The NVH training data, also simply referred to as training data, are for example used in a training mode of the software application, also referred to as learning mode, in order to train the electronic computing device 20, in respect of determining a respective phenomenon causing the measured variable, using the training data.

Alternatively or additionally, for example, databases, designated 36 in FIG. 2, are provided, in which data sets are stored, which data sets characterize respective noises or noise behaviour of the vehicle 34. The data sets are also for example transmitted to the electronic computing device 20 and received by same, and therefore the electronic computing device 20 can check the vehicle 34 based on the data sets from the databases 36. For example, a manual extraction of the data sets from the databases 36 takes place.

As illustrated by an arrow 38 in FIG. 2, the artificial intelligence AI is trained using the measured data, in particular using the training data, in order to be able to produce a particularly high detection rate. The detection rate characterizes a probability of the artificial intelligence AI or the computing device 20 being able to correctly detect a respective phenomenon which is responsible for the respective measured variable or which causes the respective measured variable. By correctly detecting the phenomenon causing the measured variable, it is possible, using the evaluation of the measured data, to detect whether the measured variable results from a fault or from a malfunction of the vehicle 34 or otherwise from a fault-free state of the vehicle 34.

Figure 3:
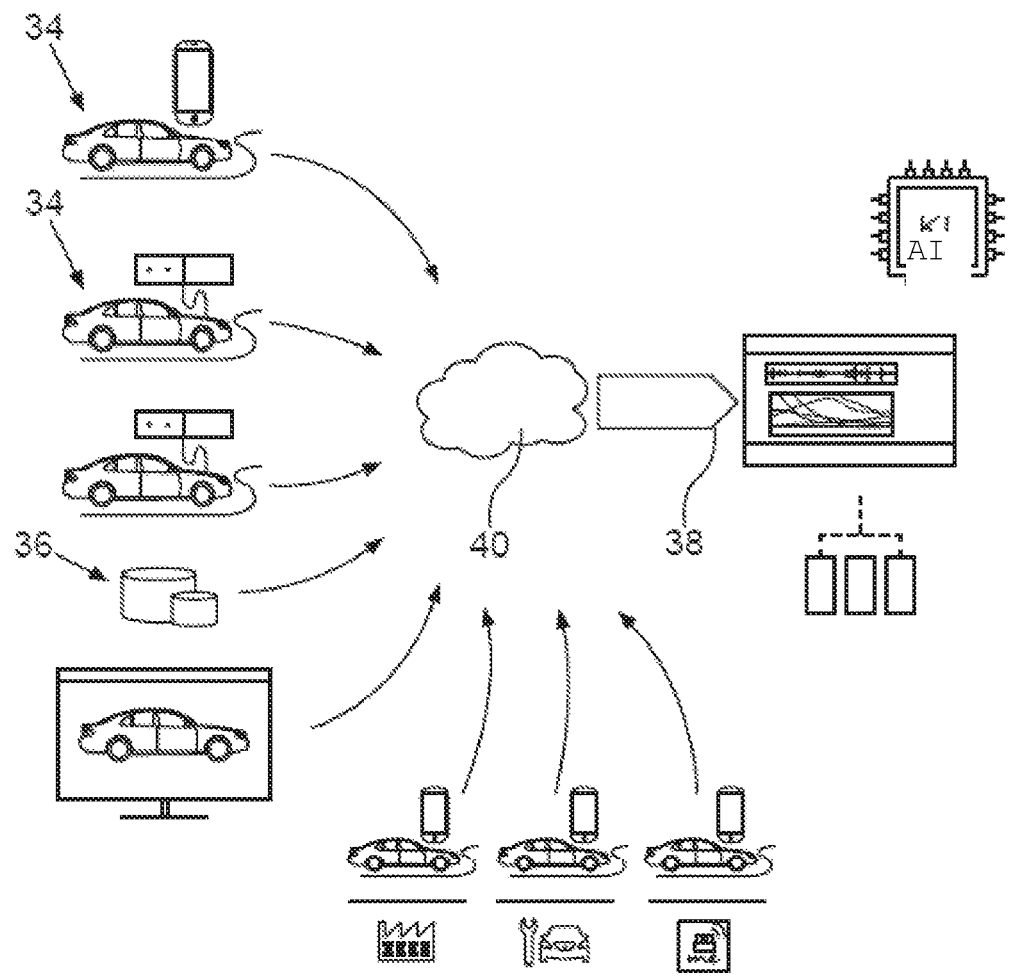
FIG. 3 is a further diagram to illustrate the method.

FIG. 3 shows a further diagram to illustrate the method. The measured data are for example driving data which are determined during a journey of the vehicle 34. Further, the measured data can comprise the abovementioned measurement instrumentation data, which are determined by means of, in particular stationary, measurement instrumentation. Alternatively or additionally, the measured data can comprise test stand data, which are determined by means of a test stand, by means of which the vehicle 34 is tested. The abovementioned data sets are for example stock data which are provided by the databases 36. Alternatively or additionally, simulation data can be provided, on the basis of which the electronic computing device 20 checks the vehicle 34.

The measured data or the driving data, the measurement instrumentation data, the test stand data, the stock data and the simulation data are transmitted for example to a data cloud 40 and thus to the electronic computing device 20 and received by the latter, and therefore there is central data access to the data. The measured data are used to determine, by means of the artificial intelligence AI, whether the acceleration and/or the noise and/or the image results from a fault-free state or from a faulty state of the vehicle 34, as a result of which the vehicle 34 can be effectively and efficiently checked. Moreover, it is conceivable to take into account maintenance data which characterize a maintenance or service of the vehicle 34, and/or production data which characterize a production of the vehicle 34, and/or customer data which characterize a customer operation of the vehicle 34, in order to check the at least one vehicle 34 by means of the electronic computing device 20.

FIG. 4 shows a schematic depiction of a first menu of the graphic user interface 14. The measurement device is connected for example via a wireless data link, for example Bluetooth, and therefore wirelessly, to the vehicle 34. The abovementioned person then selects an operating element 42 of the user interface 14, wherein in the present case the operating element 42 is a partial surface of the user interface 14. The person touches the touch-sensitive screen in a region in which the partial surface is displayed on the touch-sensitive screen. As a result, the abovementioned learning mode of the software application is started. An operating element 44 of the user interface 14 according to FIG. 5 is accordingly displayed on the touch-sensitive screen. If the person actuates the operating element 44 by the person touching the region of the touch-sensitive screen in which the operating element 44 is displayed, for example the recording of the measured variable by means of the measurement device 10 is started.

The abovementioned labelling is illustrated using FIG. 6. In order to carry out the labelling, a further menu of the user interface 14 is displayed on the touch-sensitive screen. The further menu according to FIG. 6 comprises further operating elements 46a-e. The respective operating element 46a-e corresponds to a respective description which can be assigned to the previously recorded measured variable. If the measured variable is for example a noise, the respective description can be used to assign a designation to the noise, by means of which designation for example the noise can be verbally named by a person. The person assigned the description to the measured variable by the person touching the region of the touch-sensitive screen in which the operating element 46a-e is displayed, which operating element corresponds to the description which should be assigned to the measured variable. The description is therefore a type which characterizes the measured variable.

In the learning mode, therefore, measured data can be communicated to the electronic computing device 20, which measured data characterize measured variables and therefore the phenomena causing the measured variables. Consequently, the electronic computing device 20 can distinguish between those measured variables or phenomena which occur during a fault-free state of the vehicle 34, and those measured variables or phenomena which result from malfunctions of the vehicle 34.

If the person wishes, for example, to execute not the learning mode but rather a measurement run, then the person touches the region of the touch-sensitive screen in which an operating element 48, shown in FIG. 4, of the user interface 14 is displayed. Like the operating element 42, the operating element 48 is also a surface or partial surface of the user interface 14. By activating the normal measurement run, the measured variable is recorded by means of the measurement device 10, the measured data are transmitted to the computing device 20, which can then determine whether the measured variable results from a malfunction or else from a fault-free state of the vehicle 34. To this end, the computing device 20 can compare for example the measured data received in the context of the measurement run with the measured data which the computing device 20 received in the context of the learning mode. Since for example the measured data resulting from the learning mode characterize a malfunction, the computing device 20 can compare the measured data from the measurement run with the measured data from the learning mode. For example, if the measured data from the measurement run correspond to the measured data from the learning mode, the computing device 20 can conclude that there is a malfunction of the vehicle 34. If, however, the measured data from the measurement run deviate from the measured data from the learning mode, the computing device 20 can conclude that there is a fault-free state of the vehicle 34.

FIG. 7 shows a further menu of the user interface 14. The further menu according to FIG. 7 comprises further operating elements 48*a-f*, by means of which further descriptions can be assigned to the respective measured variable or measured data.

What is claimed is:

1. A device for checking vehicles for malfunctions, comprising:
    an accelerometer that records an acceleration of a first vehicle;
    a microphone that records a noise of the first vehicle;
    a camera that records an image of a first subregion of the first vehicle;
    a wireless transceiver that wirelessly connects the device to a back-end system external to the first vehicle and the device;
    a processor; and
    a touch-screen user interface that displays:
        a measurement icon whose touch-selection causes: (a) at least one of: the accelerometer, the microphone, and the camera, to record first measured data characterizing: the acceleration, the noise, and/or the image of the first subregion, of the first vehicle, and
        (b) the wireless transceiver to transmit the first measured data to the back-end system,
        a learning icon whose touch selection causes: (a) at least one of: the accelerometer, the microphone, and the camera, to record the first measured data, (b) the processor to assign a user-selected label characterizing the first measured data to the first measured data, and (c) the wireless transceiver to transmit the first measured data and the user-selected label to the back-end system, and
        a diagnostic result received by the wireless transceiver from the back-end system, wherein the diagnostic result constitutes an evaluation of the first measured data by the back-end system for a malfunction in the first vehicle.

2. The device of claim 1, wherein the first measured data characterize a state of the first vehicle and/or a position of the first vehicle.

3. The device of claim 1, wherein the back-end system includes an artificial intelligence trained to determine the malfunction based on the first measured data.

4. The device of claim 1,
    wherein the first measured data are assigned to a first component of the first vehicle, wherein the evaluation of the first measured data is based on second measured data assigned to a second component of the second vehicle, and
    wherein the second component is structurally identical to the first component.

5. The device of claim 1 further comprising providing the device with result data resulting from the evaluating by the back-end system.

6. The device of claim 1 further comprising: receiving simulation data which characterize a simulation of a part of the first vehicle and/or production data which characterize a production of the first vehicle and/or maintenance data which characterize a maintenance of the first vehicle and/or test stand data which characterize a test of the first vehicle carried out by a test stand by the back-end system; and checking the first vehicle for the malfunction based on the simulation data and/or the production data and/or the maintenance data and/or the test stand data by the back-end system.

* * * * *